UNITED STATES PATENT OFFICE.

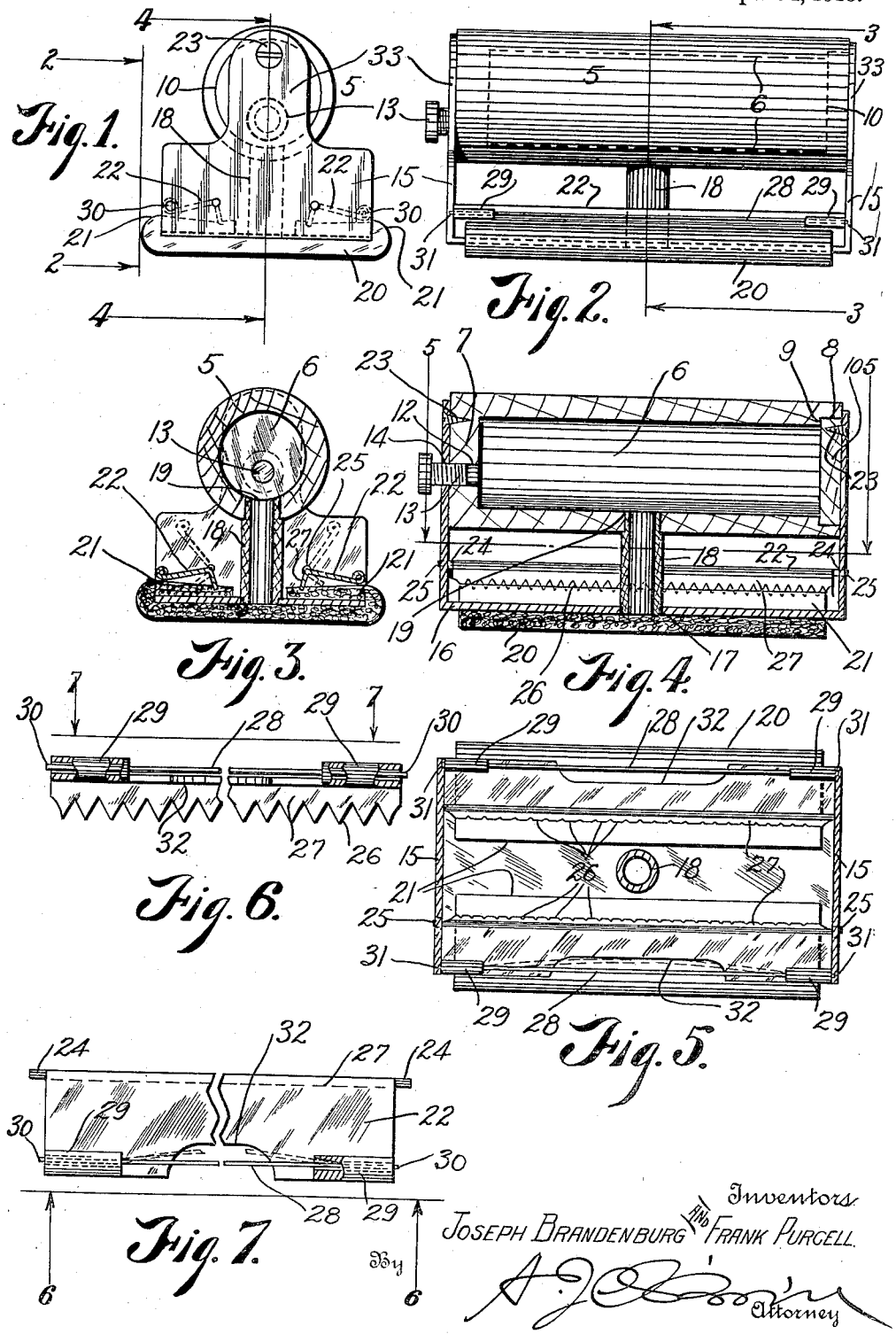

JOSEPH BRANDENBURG AND FRANK PURCELL, OF DENVER, COLORADO, ASSIGNORS, BY DIRECT AND MESNE ASSIGNMENTS, TO THE BISHOP-PURCELL MANUFACTURING & SALES COMPANY, OF DENVER, COLORADO, A CORPORATION OF COLORADO.

FOUNTAIN GRIDDLE-GREASER.

1,279,976.

Specification of Letters Patent. Patented Sept. 24, 1918.

Application filed January 23, 1918. Serial No. 213,289.

*To all whom it may concern:*

Be it known that we, JOSEPH BRANDENBURG and FRANK PURCELL, citizens of the United States, residing at the city and county of Denver and State of Colorado, have invented certain new and useful Improvements in Fountain Griddle-Greasers; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in devices for greasing griddles or pans where articles of food are to be cooked, as pan cakes. The greasing of the bottom of the pan is always required in order to prevent the cakes from sticking thereto. Where no specially constructed device is employed, a great deal of grease is wasted, while at the same time an excess of grease is usually applied to the pan and becoming ignited results in a blaze and filling the room with smoke.

Our object is to overcome this difficulty and to this end we have produced a fountain device for applying grease to pans or griddles of the aforesaid character. Our improvement consists of a fountain member, also serving as a handle when the device is in use, to the opposite ends of which are connected two members which extend upwardly from a base plate, the two upright members being secured to the opposite ends of the fountain member by means of screws or other suitable fastening devices. These upright parts, together with the base or bottom plate constitute a U-shaped member, the bottom part forming a support having a heavy piece of felt, or other suitable absorbent material adapted to receive and hold grease as it is fed downwardly thereto from the fountain member, the base plate being centrally perforated to receive a tube which is in communication with the fountain member and the absorbent pad which covers the plate underneath, the opposite extremities of the pad being carried upwardly over the plate and held in place by suitable clamping members which are hingedly connected to the upright parts of the U-shaped device.

Having briefly outlined our improvement we will proceed to describe the same in detail, reference being made to the accompanying drawing, in which is illustrated an embodiment thereof. In this drawing:

Figure 1 is an end elevation of our improved device.

Fig. 2 is a side elevation of the same.

Fig. 3 is a cross section taken on the line 3—3, Fig. 2 looking toward the left.

Fig. 4 is a vertical longitudinal section of the device taken on the line 4—4, Fig. 1.

Fig. 5 is a horizontal section taken on the line 5—5, Fig. 4 looking downwardly.

Fig. 6 is an edge view of one of the clamping members shown in detail, the same being detached from the device. This is a view looking in the direction of arrows 6, Fig. 7.

Fig. 7 is a top plan view of a clamping member or a view looking in the direction of arrows 7, Fig. 6.

The same reference characters indicate the same parts in all the views.

Let the numeral 5 designate a fountain member which is preferably cylindrical in shape and made of proper size to be easily grasped by the hand of the user. This member 5 is bored to form a cavity 6 adapted to receive a quantity of grease which is suitable for applying to the pan or griddle upon which the cakes are to be baked. The bore of this member ceases near the end 7 thereof. The opposite end is counterbored as shown at 8 to form a shoulder 9 for a plug 10 which is fitted thereinto and forms an end closure for the chamber 6. The opposite closed end 7 of the member 5 is bored to form an opening 12 through which the chamber 6 may be supplied with the necessary grease, this opening being normally closed by a threaded plug 13 which is screwed into an opening 14 formed in one of the upturned parts 15 of a base plate 16, the latter being arranged considerably below the fountain member 5 and provided with a central opening 17, which receives the lower shouldered end of a tube 18 which may be composed of wood and whose upper extremity is slipped into an opening 19 formed in the lower part of the fountain member 5 and communicating with the chamber 6. Both extremities of the tube 18 are shouldered, whereby the tube is securely held in place when the parts are assembled.

A pad 20 is applied to the bottom plate 16 of the device and its extremities are carried upwardly above said plate, as shown at 21, and are securely held in place by means of clamping members 22 which are hinged to the upright parts 15 of the U-shaped frame member of the device, these parts being secured to the fountain member by means of screws 23 or other suitable fastening devices. Each of the clamping members is provided with a hinge pin 24 at each end, these pins passing through perforations 25 formed in the upright parts 15 and arranged at a considerable distance from their outer edges, the latter being raised when it is desired to release the pad. Normally, or before the pad is put in place, the clamping members may occupy positions indicated by dotted lines in Fig. 3. As soon as the extremities of the pad are put in place above the bottom plate, one of the clamping members is first moved downwardly to the full line position in this view, after which the other is moved to the same position. During the downward movement of the last named member the teeth 26 with which a flange 27 of each member 22 is provided, catch the pad before the clamping member has reached its limit of clamping movement and draws the pad tightly across the lower surface of the bottom plate.

In order to lock the clamping members in their pad-engaging position, as illustrated in Fig. 3, we employ a spring wire 28 which engages sleeves 29 formed on the end of each clamping member which is outermost when the latter is in the clamping position. Normally the extremities 30 of these wires project slightly beyond the adjacent ends of the clamping member and enter shallow recesses 31 formed in the upright parts 15 of the U-shaped casing. When it is desired to unlock either clamping member, this wire which is preferably composed of spring steel is moved inwardly, as indicated by dotted lines in Fig. 7, the inward movement being facilitated by cutting out a recess 32 in the adjacent edge of said member inward to allow the finger or fingers of the user to pass downwardly beyond the clamping member when bending the wire for releasing purposes. This bending of the wire from the full to the dotted line position in Fig. 7 is sufficient to draw the extremities 30 thereof from their recesses in the parts 15 and allow the clamping member to be raised from its pad-holding position.

From the foregoing description the construction and operation of our improved device will be readily understood. Attention is called to the fact that the end plates 15 of the U-shaped frame are preferably reduced in width where they extend upwardly into engagement with the opposite ends of the fountain member, these reduced projections being indicated by the numeral 33.

In assembling the parts of the device, the tube 18 is placed in position with its lower extremity entering the opening 17 in the plate 16, after which the fountain member is put into position with the upper shouldered extremities of the tube entering the opening 19 in the bottom of the fountain member. The fastening devices 23 are then passed through perforations in the upright parts 15 of the device for fastening purposes. The chamber 6 of the fountain member may then be filled with the necessary grease which is introduced through the opening 12 in the plug 10 and the registering opening 14 in the adjacent part 15, after which the screw plug 13 is put in place forming a closure to prevent the escape of the grease. As soon as the pad 20 is put in place in the manner heretofore explained, the device is ready for use, since the grease will pass through the tube 18 and saturate the pad, the feed being sufficient when the device is in a warm room and particularly when heated as it will be to accomplish the desired function.

Having thus described our invention, what we claim is:

1. A greaser comprising a base member, a pair of supports projecting therefrom, a hollow handle connected with said supports, the sides of said handle being exposed, whereby the handle may be readily grasped, the cavity in the handle constituting a reservoir, said base having an aperture therein, said handle having an aperture therein, a pad mounted on the base member and covering the aperture therein, and a tube coöperating with said apertures to provide communication between said reservoir and said handle whereby said pad may receive grease directly from said reservoir.

2. A greaser comprising a base member, a pair of supports projecting from opposite sides of said member, a hollow elongated handle spaced from the base member, mounted between said supports and having its ends secured thereto, the sides of said handle being exposed whereby the same may be readily grasped, the hollow handle constituting also a grease reservoir, the handle having an aperture therein, an aperture in said base member, a tube fitted to said apertures and providing communication therebetween, a pad removably mounted on said base member and covering the aperture therein, whereby said pad may receive grease directly from said reservoir.

3. A device of the class described comprising a frame having a bottom plate, a grease container mounted on the frame and arranged above said plate, the frame having a passage leading from the container to the plate, an absorbent pad applied to the lower surface of the plate and turned upwardly to engage the top surface thereof on opposite sides, means for holding the pad in place, including a pair of hinged clamping plates having toothed pad-engaging edges, and means for locking the clamping plates in the pad-securing relation, comprising spring-actuated pins carried by the clamping plates and adapted to engage recesses formed in the frame.

In testimony whereof we affix our signatures.

JOSEPH BRANDENBURG.
FRANK PURCELL.